Patented Jan. 5, 1932

1,839,220

UNITED STATES PATENT OFFICE

FRIEDRICH AUGUST HENGLEIN AND FRIEDRICH WILHELM STAUF, OF COLOGNE-DEUTZ, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PURIFICATION OF METALLIC SALT SOLUTIONS

No Drawing. Application filed July 9, 1928, Serial No. 291,482, and in Germany July 21, 1927.

The present invention concerns the purification of metallic salt solutions contaminated by cellulose-like substances and consists in treating the same at temperatures above 130° C. with oxygen or oxygen containing gases at super-atmospheric pressures.

Metallic salt solutions containing cellulose-like substances, in solution or in a more or less finely divided state, are produced in various technical processes, for example, zinc chloride solutions in the manufacture of vulcanized fiber or parchment paper. The purification of such solutions, which are colored by cellulose and the like has already been undertaken in various manners, for example, with chlorine, hydrogen peroxide or chlorates.

In accordance with the present invention the metallic salt solutions in question are readily purified by treatment with oxygen or oxygen containing gases under a pressure above one atmosphere, provided that the oxidation of the cellulose-like compounds to carbonic acid and other degradation products is carried out at temperatures above about 130° C. The process has the great advantage that no new chemical substances are introduced into the solution, the cellulose-like substances yielding carbonic acid, which is driven out of the solution.

The invention is illustrated by the following example, without being limited thereto:

*Example.*—One litre of zinc chloride solution containing 190 grams of zinc chloride and 20 grams of cellulose-like material is treated with oxygen gas at 20 atmospheres pressure in an autoclave with stirring at about 200° C. After 4 hours the solution is as clear as water and no longer contains any organic substance.

We claim:

1. Process for the purification of metallic salt solutions contaminated by cellulose-like substances, consisting in treating the same at temperatures above about 130° C. with oxygen at super-atmospheric pressure.

2. Process for the purification of metallic salt solutions contaminated by cellulose-like substances, consisting in treating the same at temperatures above about 130° C. with oxygen containing gases at super-atmospheric pressure.

3. Process for the purification of zinc chloride solutitons contaminated by cellulose like substances, consisting in treating same at a temperature of about 200° C., while stirring with oxygen gas at a pressure of about 20 atmospheres.

In testimony whereof we have hereunto set our hands.

FRIEDRICH AUGUST HENGLEIN.
FRIEDRICH WILHELM STAUF.